United States Patent
Chen

(10) Patent No.: US 9,525,357 B2
(45) Date of Patent: Dec. 20, 2016

(54) CONTROL AND DRIVE CIRCUIT AND METHOD

(71) Applicant: Silergy Semiconductor Technology (Hangzhou) LTD, Hangzhou, ZheJiang Province (CN)

(72) Inventor: Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 239 days.

(21) Appl. No.: 14/024,813

(22) Filed: Sep. 12, 2013

(65) Prior Publication Data

US 2014/0112031 A1    Apr. 24, 2014

(30) Foreign Application Priority Data

Oct. 23, 2012  (CN) .......................... 2012 1 0407340

(51) Int. Cl.
*H02M 3/335*  (2006.01)
*H02M 1/08*  (2006.01)

(52) U.S. Cl.
CPC ..... *H02M 3/33592* (2013.01); *H02M 3/33523* (2013.01); *H02M 3/33553* (2013.01); *H02M 1/08* (2013.01); *Y02B 70/1475* (2013.01)

(58) Field of Classification Search
CPC ..................... H02M 3/33523; H02M 3/33553; H02M 3/33592; H02M 1/08
See application file for complete search history.

(56) References Cited

U.S. PATENT DOCUMENTS

| | | | |
|---|---|---|---|
| 6,671,193 B1* | 12/2003 | Pelkonen | 363/53 |
| 2002/0141206 A1* | 10/2002 | Brkovic | 363/24 |
| 2002/0196642 A1* | 12/2002 | Goder | H02M 3/073 363/21.11 |
| 2007/0025123 A1* | 2/2007 | Kim et al. | 363/16 |
| 2007/0121351 A1* | 5/2007 | Zhang et al. | 363/21.12 |
| 2008/0144339 A1* | 6/2008 | Hsieh et al. | 363/21.02 |
| 2009/0040792 A1* | 2/2009 | Yang et al. | 363/21.06 |
| 2009/0091951 A1* | 4/2009 | Yang et al. | 363/21.06 |
| 2009/0091960 A1* | 4/2009 | Yang | 363/127 |
| 2009/0110129 A1* | 4/2009 | Yang et al. | 375/354 |
| 2009/0129125 A1* | 5/2009 | Yang | 363/21.14 |
| 2009/0135631 A1* | 5/2009 | Yang | 363/89 |
| 2009/0207637 A1* | 8/2009 | Boeke | 363/21.14 |

(Continued)

*Primary Examiner* — Fred E Finch, III
(74) *Attorney, Agent, or Firm* — Michael C. Stephens, Jr.

(57) ABSTRACT

Disclosed herein are control and drive circuits and methods for synchronous rectification switching power supply bias voltage generating circuits configured for a switching power supply. In one embodiment, a control and drive circuit can include: (i) a primary side switch controller configured to generate a primary side switch control signal; (ii) a logic circuit configured to generate a first control signal based on the primary side switch control signal; (iii) a converting circuit configured to generate a second control signal based on the first control signal; and (iv) a synchronous rectifier switch controller configured to generate a synchronous rectifier switch control signal based on the second control signal such that phases of the primary side switch control signal and the synchronous rectifier switch control signal are the same or inverse based on a topology of the synchronous rectification switching power supply.

20 Claims, 13 Drawing Sheets

(56) References Cited

U.S. PATENT DOCUMENTS

2010/0046252 A1* 2/2010 Keller ............... H02M 3/33523
                                                        363/21.07
2011/0063877 A1* 3/2011 Yang et al. ................ 363/21.06
2012/0257421 A1* 10/2012 Brkovic .................... 363/21.07

* cited by examiner

CONTROL AND DRIVE CIRCUIT AND METHOD

RELATED APPLICATIONS

This application claims the benefit of Chinese Patent Application No. 201210407340.7, filed on Oct. 23, 2012, which is incorporated herein by reference in its entirety.

FIELD OF THE INVENTION

The present invention relates to the field of switching power supplies, and more particularly to control and drive circuits and methods.

BACKGROUND

With the development of switching power supply technology, low voltage and high current switching power supplies are becoming increasingly important. Also, the power conversion efficiency of such power supplies is an important consideration. Synchronous rectification is an approach commonly used in low voltage high current applications to improve efficiency. By applying synchronous rectification technology, power losses in a synchronous rectification switching power supply can be reduced. Further, different driving modes of the synchronous rectifier switch can have different impacts on the efficiency.

SUMMARY

In one embodiment, a control and drive circuit configured for a synchronous rectification switching power supply, can include: (i) a primary side switch controller configured to generate a primary side switch control signal; (ii) a logic circuit configured to generate a first control signal based on the primary side switch control signal; (iii) a converting circuit configured to generate a second control signal based on the first control signal; and (iv) a synchronous rectifier switch controller configured to generate a synchronous rectifier switch control signal based on the second control signal such that phases of the primary side switch control signal and the synchronous rectifier switch control signal are the same or inverse based on a topology of the synchronous rectification switching power supply.

In one embodiment, a control and drive method configured for a synchronous rectification switching power supply, can include: (i) generating a primary side switch control signal; (ii) generating a first control signal by performing a logic operation on the primary side switch control signal; (iii) generating a second control signal by differential conversion of the first control signal; and (iv) generating a synchronous rectifier switch control signal in response to the second control signal.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1A:
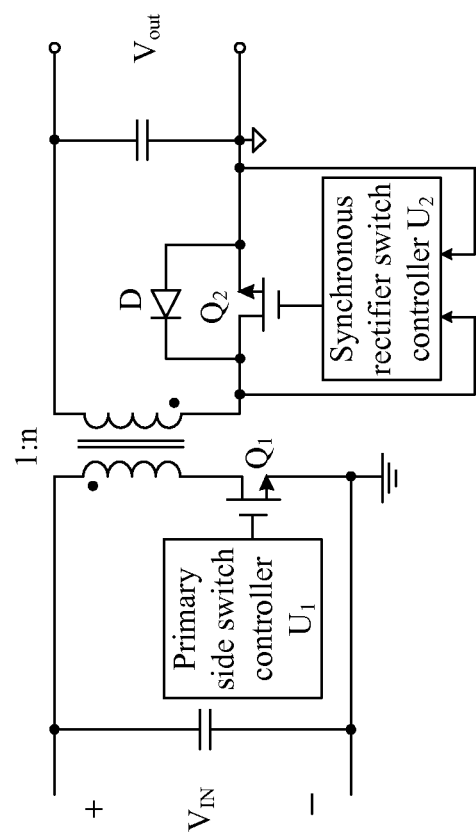
FIG. 1A is a schematic block diagram of a first example flyback synchronous rectification switch power supply.

Referring now to FIG. 1A, shown is a first example drive control method of a flyback synchronous rectification switching power supply. Primary side switch controller $U_1$ can generate a pulse-with modulation (PWM) signal to control on and off of primary side switch $Q_1$. When the PWM signal is high, primary side switch $Q_1$ can be turned on, and the energy can be stored in the transformer. At this point, drain-source voltage $V_{DS}$ of synchronous rectifier switch $Q_2$ can be greater than zero. After synchronous rectifier switch controller $U_3$ detects $V_{DS}>0$, synchronous rectifier switch $Q_2$ can be turned off.

When the PWM signal is low, primary side switch $Q_1$ can be turned off, and energy stored in the transformer can be transferred from the primary side to the secondary side. The secondary side current can flow through internal anti-parallel diode D of synchronous rectifier switch $Q_2$, which can lead to the drain-source voltage of synchronous rectifier switch $Q_2$ becoming to $V_{DS}=-U_{DF}$, where $V_{DF}$ can be the forward voltage drop of anti-parallel diode D. This may indicate that at this time, drain-source voltage $V_{DS}$ of synchronous rectifier switch $Q_2$ can be less than zero. When synchronous rectifier drive detects $V_{DS}<0$, synchronous rectifier switch $Q_2$ can be turned on, and the secondary side current can flow through synchronous rectifier switch $Q_2$ rather than anti-parallel diode D, until the primary side switch controller once again outputs a high signal that can turn primary switch $Q_1$ on, and synchronous rectifier switch $Q_2$ may again be turned off.

This synchronous rectification control method can improve efficiency of the flyback power supply by replacing the fast recovery diodes in ordinary flyback converters with a MOS transistor with relatively low ON-resistance. However, if the secondary current does not drop to zero, primary switch drive $U_1$ may have controlled primary switch $Q_1$ to turn on, which can lead to the phenomenon that two switches may be turned on simultaneously (e.g., cross-conduction) in the converter.

To avoid the occurrence of cross-conduction, this control method can be mainly applied to a flyback converter operating in a discontinuous conduction mode (DCM) or an LLC resonant converter with secondary current that can reach to zero. Moreover, in a synchronous rectification switching power supply, the shorter the conduction time of the anti-parallel diode D, the higher the overall efficiency of the power supply. However, in this example, on and off control of the synchronous rectifier switch $Q_2$ can be rather complicated, and it may be difficult to reduce the conduction time of anti-parallel diode D. As a result, it may be difficult to further improve power efficiency with this approach.

Figure 1B:
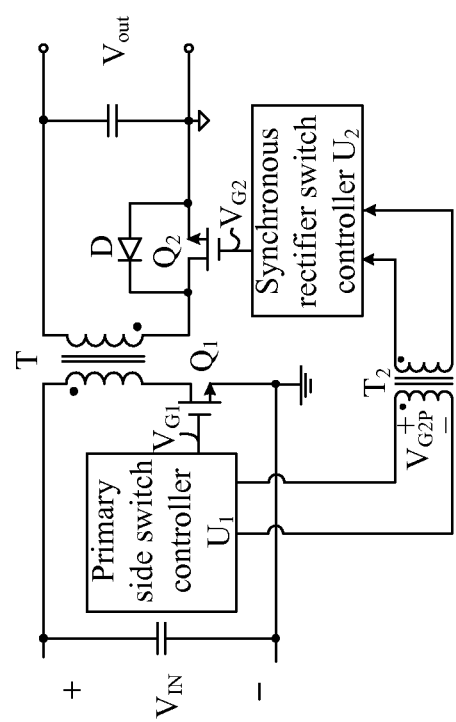
FIG. 1B is a schematic block diagram of a second example flyback synchronous rectification switch power supply.

Referring now to FIG. 1B, shown is a second example drive control method of a flyback synchronous rectification switching power supply. Here, the primary switch controller $U_1$ can be used to generate two PWM signals $V_{G1}$ and $V_{G2P}$. PWM signals $V_{G1}$ and $V_{G2P}$ may be complementary signals, and transformer $T_2$ can be used for transmitting PWM signal $V_{G2P}$ to the secondary side. When the PWM signal $V_{G1}$ is high and complementary PWM signal $V_{G2P}$ is low, PWM signal $V_{G1}$ can control primary side switch $Q_1$ to be turned on. Also, complementary PWM signal $V_{G2P}$ can be transferred to the secondary side through transformer $T_2$, and may be converted to synchronous rectifier switch control signal $V_{G2}$ through the synchronous rectifier switch controller. At this time, synchronous rectifier switch control signal $V_{G2}$ can also be low, and synchronous rectifier switch $Q_2$ can be turned off.

When PWM signal $V_{G1}$ goes low, and complementary PWM signal $V_{G2P}$ goes high, PWM signal $V_{G1}$ can control primary side switch $Q_1$ to be turned off. At this time, synchronous rectifier switch control signal $V_{G2}$ can go high, which can control synchronous rectifier switch $Q_2$ to be turned on. In this way, this scheme can solve the problem of cross-conduction as discussed above, and on and off control of synchronous rectifier switch $Q_2$ can also be simplified. However, due to the existence of transformer $T_2$, the size and cost of the circuit can be greatly increased, and it may be difficult to transmit the rapidly changing duty cycle signal through transformer $T_2$.

In particular embodiments, a driving signal of the synchronous rectifier switch can be quickly and accurately obtained based on driving signals of the primary side switch in high-frequency power supplies. A drive and control circuit in particular embodiments may also meet requirements of low cost, small size, high efficiency, and high reliability, and can also resolve the problem of cross-conduction for a synchronous rectification switching power supply.

In one embodiment, a control and drive circuit configured for a synchronous rectification switching power supply, can include: (i) a primary side switch controller configured to generate a primary side switch control signal; (ii) a logic circuit configured to generate a first control signal based on the primary side switch control signal; (iii) a converting circuit configured to generate a second control signal based on the first control signal; and (iv) a synchronous rectifier switch controller configured to generate a synchronous rectifier switch control signal based on the second control signal such that phases of the primary side switch control signal and the synchronous rectifier switch control signal are the same or inverse based on a topology of the synchronous rectification switching power supply.

Figure 2A:
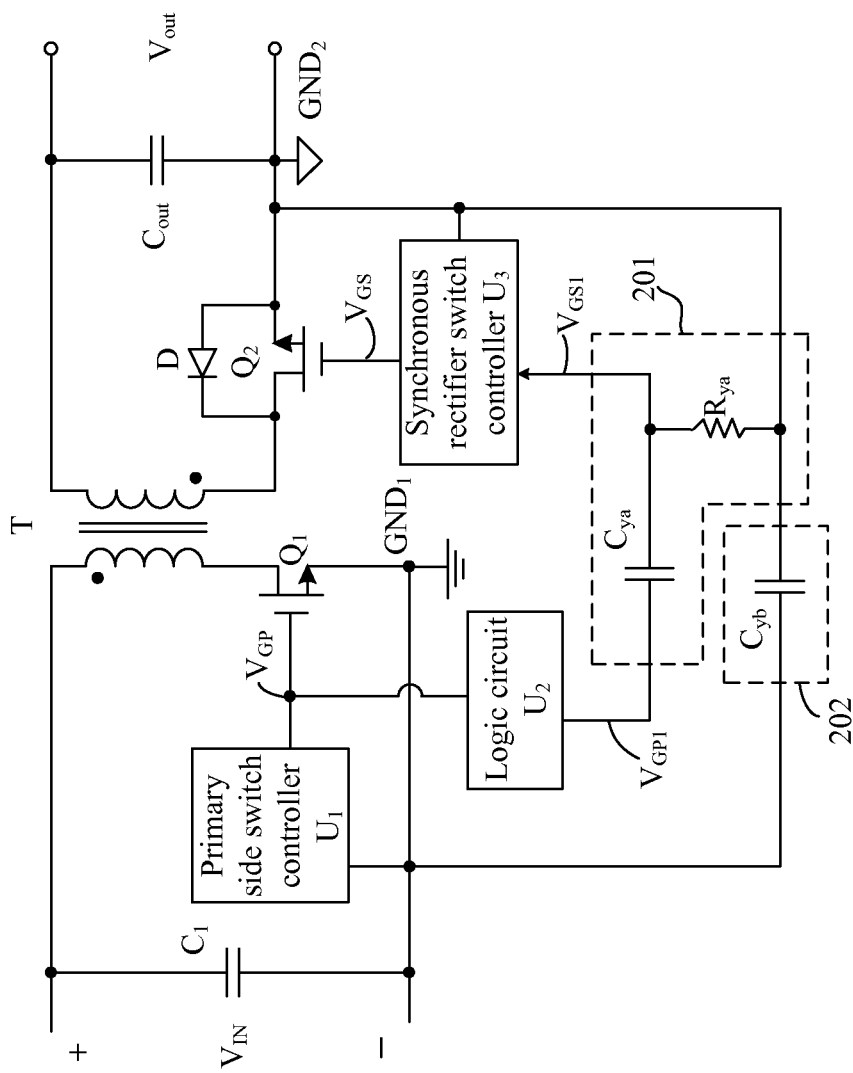
FIG. 2A is a schematic block diagram of a first example flyback synchronous rectification switch power supply in accordance with embodiments of the present invention.

Referring now to FIG. 2A, shown is a flyback synchronous rectification switching power supply in accordance with embodiments of the present invention. This example flyback synchronous rectification switching power supply can include a power stage circuit and a drive circuit used for converting DC voltage $V_{IN}$ to output voltage $V_{out}$. The power stage circuit can include filter capacitor $C_1$, transformer T, primary side switch $Q_1$, synchronous rectifier switch $Q_2$, and output filter capacitor $C_{out}$. The drive circuit can include primary side switch controller $U_1$, logic circuit $U_2$, converting circuit 201, and synchronous rectifier switch controller $U_3$.

Primary side switch controller $U_1$ can be used to generate primary side switch control signal $V_{GP}$ to control a switching operation of primary side switch $Q_1$. A first output terminal of primary side switch controller $U_1$ can connect to a control terminal of primary switch $Q_1$ and an input terminal of logic circuit $U_2$. Logic circuit $U_2$ can be used for receiving primary side switch control signal $V_{GP}$ to generate control signal $V_{GP1}$ that can connect to an input terminal of converting circuit 201.

Converting circuit 201 can receive control signal $V_{GP1}$, and may generate control signal $V_{GS1}$. An output terminal of converting circuit 201 can connect to an input terminal of synchronous rectifier switch controller $U_3$. Synchronous rectifier switch controller $U_3$ can receive control signal $V_{GS1}$, and can generate synchronous rectifier switch control signal $V_{GS}$ for controlling the switching operation of synchronous rectifier switch $Q_2$. An output terminal of synchronous rectifier switch controller $U_3$ can connect to a control terminal of synchronous rectifier switch $Q_2$. In this example, converting circuit 201 can include a differential circuit in which differential capacitor $C_{ya}$ and differential resistor $R_{ya}$ are connected in series. For example, differential capacitor $C_{ya}$ can have a capacitance in a range of from about 0.1 pF to about 100 pF, and differential resistor $R_{ya}$ can have a resistance in a range of from about 1 kΩ To about 1 MΩ.

Figure 2B:
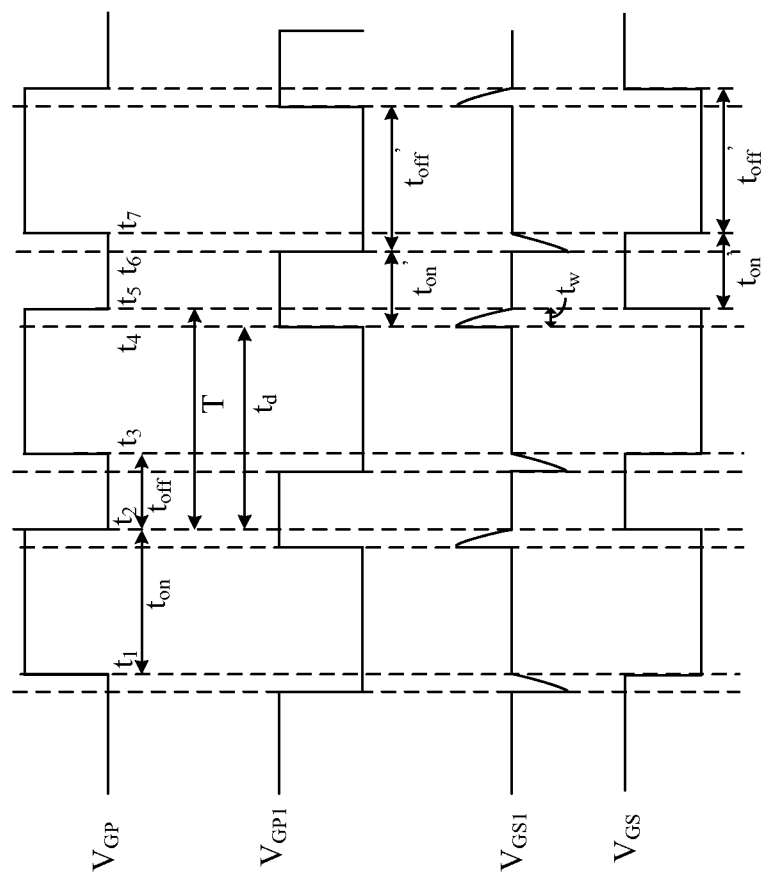
FIG. 2B is a waveform diagram showing example operation of the flyback synchronous rectification switching power supply of FIG. 2A.

Viewed in conjunction with the example waveform diagram of the flyback synchronous rectification switching power supply shown in FIG. 2B, working principles can be described as follows. At time $t_1$, primary side switch controller $U_1$ can control primary side switch control signal $V_{GP}$ to go high so that primary side switch $Q_1$ can be turned on. After turn-on time $t_{on}$, at time $t_2$, primary side switch control signal $V_{GP}$ may go low to turn off primary side switch $Q_1$. After turn-off time $t_{off}$, at time $t_3$, primary side switch control signal $V_{GP}$ may go high again to turn on primary side switch $Q_1$.

Control signal $V_{GP1}$ can be obtained by the delay and inverting process of primary side switch control signal $V_{GP}$ through logic circuit $U_2$, where the delay time can be set to $t_d$. Thus, at time $t_4$, control signal $V_{GP1}$ may transition from low to high. Since the voltage of differential capacitor $C_{ya}$ in converting circuit 201 may not be mutated, a short circuit effect can be seen, and primary side switch driving signal $V_{GP}$ can be added to differential resistor $R_{ya}$. This can cause control signal $V_{GS1}$ to rise instantaneously, and a positive spike signal can be generated with an amplitude that is the same as the amplitude of primary side switch driving signal $V_{GP}$. Then, differential capacitor $C_{ya}$ may charge exponentially, thus the voltage of differential resistor $R_{ya}$ can decrease exponentially, and the positive spike signal can reach zero after time $t_w$ at time $t_5$.

Also, based on the detected negative-direction zero crossing signal of control signal $V_{GS1}$, synchronous rectifier switch controller $U_3$ can control synchronous rectifier switch control signal $V_{GS}$ to go high. After the conduction time $t_{on}$, of the control signal (where, $t_{on}=t_{off}$), at time $t_6$, control signal $V_{GP1}$ can transition from high to low. Since voltage stored in differential capacitor $C_{ya}$ in converting circuit 201 may not be mutated, control signal $V_{GS1}$ may drop instantaneously, and a negative spike signal can be generated.

Then, differential capacitor $C_{ya}$ can discharge exponentially, and the negative spike signal may reach to zero at time $t_7$ after time $t_w$. Based on the detected positive-direction zero crossing signal of control signal $V_{GS1}$, synchronous rectifier switch controller $U_3$ can control synchronous rectifier switch control signal $V_{GS}$ to go low. By repeating the operation, drive control of the synchronous rectification switching power supply can be achieved.

In order to maximize efficiency, the switch timing of primary side switch $Q_1$ and synchronous rectifier switch $Q_2$ can be strictly controlled. When primary side switch $Q_1$ is turned off, synchronous rectifier switch $Q_2$ can be controlled to turn on, and when synchronous rectifier switch $Q_2$ is turned off, primary side switch $Q_1$ can be controlled to turn on. In this example, by setting the width of the spike signal and the delay time, the switching timing of primary side switch $Q_1$ and synchronous rectifier switch $Q_2$ can be controlled.

Initially, the width of spike signal can be set as $t_w=3\times\tau$, where $\tau=R_{ya}\times C_{ya}$, and the delay time can be set as $t_d=T-t_w$, where T can be the switch period. For example, the width of spike signal can be set to meet requirements of $t_w<t_{on}$ and $t_w<t_{off}$, where $t_{on}$ can be the conduction time of the primary side switch, and $t_{off}$ can be the off time of the primary side switch. In this particular example, the width of the spike signal can be set to $t_w=3\times\tau$ because typically differential capacitor $C_{ya}$ can essentially reach the amplitude after three RC time constants $\tau$. Of course, the width of spike signal can also be set to other values, such as $t_w=4\times\tau$, $t_w=5\times\tau$, or $t_w=6\times\tau$.

Figure 2C:
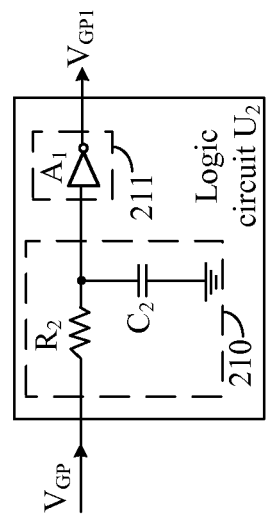
FIG. 2C is a schematic block diagram of an example logic circuit in the flyback synchronous rectifier switch power supply of FIG. 2A.

Referring now to FIG. 2C, shown is an example logic circuit of the flyback synchronous rectifier switch power supply of FIG. 2A. Logic circuit $U_2$ can include delay circuit 210 and inverter 211. Delay circuit 210 can be used for delaying primary side switch control signal $V_{GP}$ by delay time $t_d$. The input terminal of delay circuit 210 can connect to the output terminal of primary side switch controller $U_1$, and the output terminal of delay circuit 210 can connect to the input terminal of inverter 211. Inverter 211 can be used to invert delayed primary side switch control signal $V_{GP}$, and the output terminal of inverter 211 can connect to converting circuit 201.

In this particular example, delay circuit 210 can be implemented by resistor $R_2$ and capacitor $C_2$, and the delay time $t_d$ can be obtained by adjusting parameters of resistor $R_2$ and capacitor $C_2$. As those skilled in the art will recognize, the function of logic circuit $U_2$ can be achieved by exchanging the connection positions of delay circuit 210 and inverter 211 in FIG. 2C. Of course, logic circuit $U_2$ can also be implemented by any other circuit that can realize the same or similar (e.g., inverting, delaying, etc.) functionality.

Figure 2D:
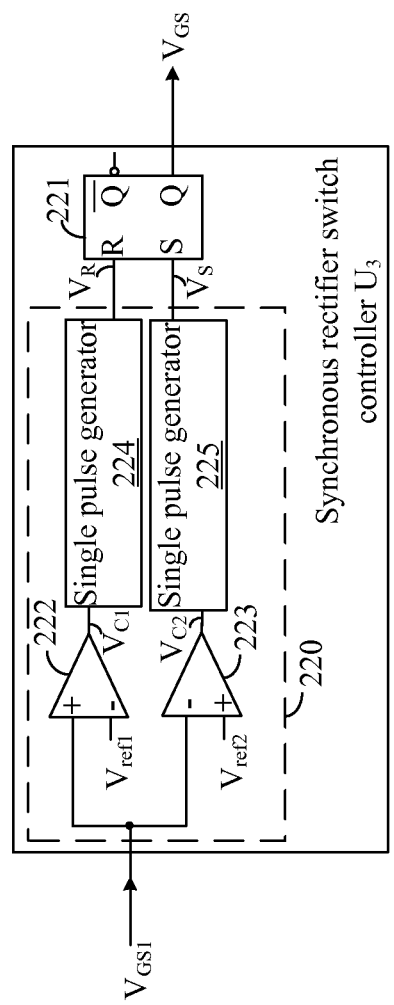
FIG. 2D is a schematic block diagram of an example controller synchronous rectifier switch controller in the flyback synchronous rectifier switch power supply of FIG. 2A.

Referring now to FIG. 2D, shown is an example synchronous rectification controller in the flyback synchronous rectification switching power supply of FIG. 2A. Synchronous rectifier switch controller $U_3$ can include zero-crossing detection circuit 220 and RS flip-flop 221. Zero-crossing detection circuit 220 can include comparator 222, comparator 223, single pulse generator 224, and single pulse generator 225. For example, a "single" pulse generator circuit can be a "one-shot" type of circuit. Also, the single pulse may be repeated based on the state or transition of the input signal to the single pulse generator circuit. The non-inverting input terminal of comparator 222 and the inverting input terminal of comparator 223 can connect to the output terminal of converting circuit 201 to receive control signal $V_{GS1}$.

The inverting input terminal of comparator 222 can receive reference voltage $V_{ref1}$, and the output terminal can provide comparison signal $V_{C1}$ to the input terminal of single pulse generator 224. The output terminal of single pulse generator 224 can generate reset signal $V_R$ to reset terminal R of RS flip-flop 221 to reset synchronous rectifier switch control signal $V_{GS}$. The non-inverting input terminal of comparator 223 can receive reference voltage $V_{ref2}$, and the output terminal can provide comparison signal $V_{C2}$ to the input terminal of single pulse generator 225. The output terminal of single pulse generator 225 can provide set signal $V_S$ to set terminal S of RS flip-flop 221 to set synchronous rectifier switch control signal $V_{GS}$.

Figure 2E:
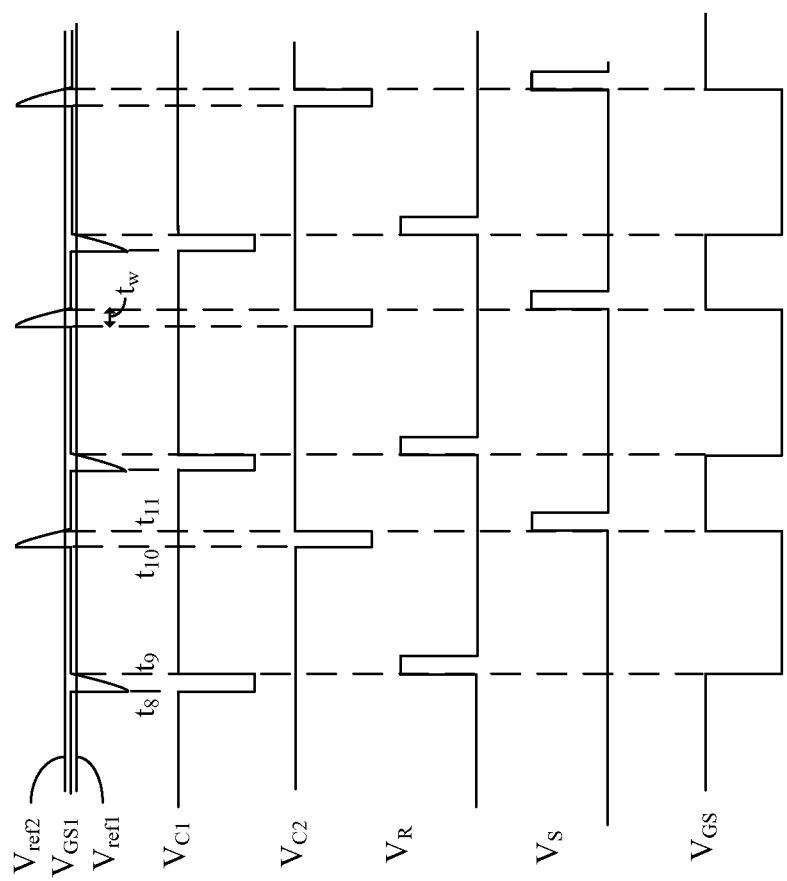
FIG. 2E is a waveform diagram showing example operation of the synchronous rectifier switch controller of FIG. 2D.

Output terminal Q of RS flip-flop 221 can connect to the control terminal of synchronous rectifier switch $Q_2$ to generate synchronous rectifier switch control signal $V_{GS}$. For example, reference voltage $V_{ref1}$ can be set to slightly less than zero, and reference voltage $V_{ref2}$ can be set to slightly greater than zero. As shown in the waveform diagram of FIG. 2E, at time $t_8$, when control signal $V_{GS1}$ is generating a negative spike signal and is less than reference voltages $V_{ref1}$ and $V_{ref2}$, comparison signal $V_{C1}$ may go low, and comparison signal $V_{C2}$ may go high. Also, synchronization rectifier control signal $V_{GS}$ can go high.

At time $t_9$, when control signal $V_{GS1}$ reaches a level of reference voltage $V_{ref1}$, comparison signal $V_{C1}$ may go high, and single pulse generator 224 can generate single pulse reset signal $V_R$ to reset synchronous rectifier switch control signals $V_{GS}$ to low. When control signal $V_{GS1}$ generates a positive spike signal greater than reference voltage $V_{ref2}$, comparison signal $V_{C2}$ can go low, and synchronous rectifier switch control signal $V_{GS}$ be reset to low. When control signal $V_{GS1}$ reaches reference voltage $V_{ref2}$, comparison signal $V_{C2}$ can go high, and single pulse generator 225 can generate single pulse set signal $V_S$ to set synchronous rectifier switch control signal $V_{GS}$ to be high. By repeating these operations, the synchronous rectifier switch controller $U_3$ can generate synchronous rectifier switch control signal $V_{GS}$ based on control signal $V_{GS1}$.

Besides the example shown in FIG. 2D, the function of synchronous rectifier switch controller $U_3$ can also be achieved by other circuits. In the examples of FIGS. 2C and 2D, inverter 211 can be added to logic circuit $U_2$ to invert synchronous rectifier switch control signal $V_{GS}$ and primary side switch control signal $V_{GP}$. Those skilled in the art can infer that, by adding delay circuit 210 to logic circuit $U_2$, and the inverter to synchronous rectifier switch controller $U_3$ synchronous rectifier switch control signals $V_{GS}$ and primary side switch control signal $V_{GP}$ can be inverted.

In this example, the flyback synchronous rectification switching power supply can also include isolation circuit 202. Isolation circuit 202 can include isolation capacitor $C_{yb}$. Isolation capacitor $C_{yb}$ can be coupled between the primary side ground and the secondary side ground, and can be used to isolate primary side ground $GND_1$ and secondary side ground $GND_2$ of the flyback synchronous rectification switch power supply. Here, the reference ground of primary side switch controller $U_1$ can be primary side ground $GND_1$, and the reference ground of synchronous rectifier switch drive $U_3$ can be secondary ground $GND_2$.

Thus in this example, by controlling the timing relationship of control signal $V_{GP1}$ and primary side switch control signal $V_{GP}$, control signal $V_{GP1}$ can be generated based on primary side switch control signal $V_{GP}$. Also, by using converting circuit 201, control signal $V_{GP1}$ can be quickly and accurately converted to control signal $V_{GS1}$. In addition, control signal $V_{GS1}$ can be converted to synchronous rectifier switch control signal $V_{GS}$ through synchronous rectifier switch controller $U_3$, in order to control synchronous rectifier switch $Q_2$.

In particular embodiments, cross-conduction of primary side switch $Q_1$ and synchronous rectifier switch $Q_2$ can be substantially avoided, and the conduction time of antiparallel diode D of synchronous rectifier switch $Q_2$ can be substantially reduced in order to maximize system efficiency. Because the converting circuit can be realized by differential capacitor $C_{ya}$ and differential resistor $R_{ya}$, cost and size can be reduced in power density can be increased as compared to the approach of FIG. 1B where a signal is transmitted through a transformer. In addition, isolation circuit 202 in this example can be realized by isolation capacitor $C_{yb}$ which can suppress common mode interference. Also, potential electric shock can be prevented due to failure of the capacitor, and reliability and overall security of the synchronous rectification switching power supply can be enhanced.

Figure 3:
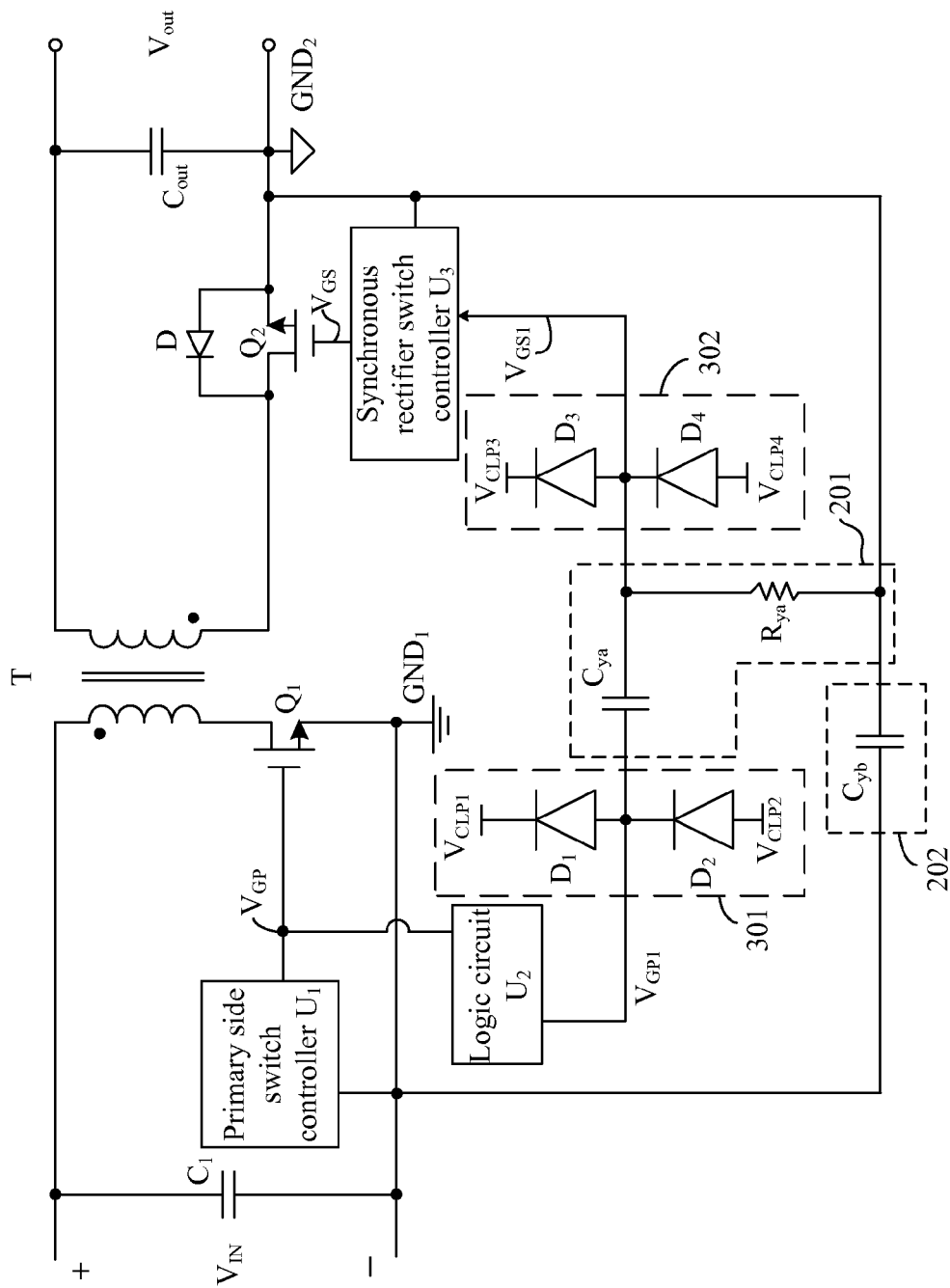
FIG. 3 is a schematic block diagram of a second example flyback synchronous rectification switching power supply in accordance with embodiments of the present invention.

Referring now to FIG. 3, shown is another example synchronous rectification switching flyback power supply in accordance with embodiments of the present invention. Among the differences from the flyback synchronous rectification switching power supply in FIG. 2A, are that clamp circuits 301 and 302 can be added to protect primary switch controller $U_1$ and synchronous rectifier switch controller $U_3$. Clamp circuit 301 can include diode $D_1$, diode $D_2$, clamping voltage $V_{CLP1}$, and clamping voltage $V_{CLP2}$. The cathode of diode $D_1$ can be coupled to clamping voltage $V_{CLP1}$ its anode can connect to the cathode of diode $D_2$, and the common terminal can connect to the input terminal of switching circuit 201. The anode of diode $D_2$ can connect to clamping voltage $V_{CLP2}$.

Clamp circuit 302 can include diode $D_3$, diode $D_4$, clamping voltage $V_{CLP3}$, and clamping voltage $V_{CLP4}$. The cathode of diode $D_3$ can connect to clamping voltage $V_{CLP3}$, its anode can connect to the cathode of diode $D_4$, and the common terminal can connect to the output terminal of switching circuit 201. Also, the anode of fourth diode $D_4$ can connect to clamping voltage $V_{CLP4}$. For example, clamping voltage $V_{CLP1}$ can be set to be slightly higher than the maximum value of control signal $V_{GP1}$. Also, clamping voltage $V_{CLP2}$ can be set to be slightly less than the minimum value of control signal $V_{GP1}$. Further, clamping voltage $V_{CLP1}$ and clamping voltage $V_{CLP2}$ can take primary $GND1$ as the reference ground.

For example, clamping voltage $V_{CLP3}$ can be set to be slightly higher than the maximum value of the differential signal $V_{GS2}$. Also, clamping voltage $V_{CLP4}$ can be set to be slightly less than the minimum value of control signal $V_{GP2}$. In addition, clamping voltage $V_{CLP3}$ and clamping voltage $V_{CLP4}$ can take secondary $GND2$ as the reference ground. Because of clamp circuit 301, when the voltage of control signal $V_{GP1}$ fluctuates due to interference, in the maximum value being higher than $V_{CLP1}$, diode $D_1$ may be turned on, and the voltage of control signal $V_{GP1}$ can be clamped to clamping voltage $V_{CLP1}$. When the voltage of control signal $V_{GP1}$ fluctuates due to interference, resulting in the minimum value being lower than $V_{CLP2}$, diode $D_2$ may be turned on, and the voltage of control signal $V_{GP1}$ can be clamped to clamping voltage $V_{CLP2}$.

Similarly, because of clamp circuit 302, when the voltage of control signal $V_{GP2}$ fluctuates due to interference, resulting in the maximum value being higher than $V_{CLP3}$, diode $D_3$ may be turned on, and the voltage of control signal $V_{GS1}$ can be clamped to clamping voltage $V_{CLP3}$. When the voltage of control signal $V_{GS1}$ fluctuates due to interference, resulting in the minimum value being lower than $V_{CLP4}$, diode $D_4$ may be turned on, and the voltage of control signal $V_{GS1}$ can be clamped to clamping voltage $V_{CLP4}$.

Besides clamp circuits 301 and 302, the circuit structure and working principle of the remaining parts in the present example can be the same or similar to that of the flyback synchronous rectification switching power supply of FIG. 2A. Due to clamp circuits 301 and 302, the voltage magnitude of control signals $V_{GP1}$ and $V_{GS1}$ can be maintained as not too large or too small due to the interference. In this way, primary side switch controller $U_1$ and the synchronous rectifier switch controller $U_3$ can be protected for proper operation. Furthermore, clamping voltage $V_{CLP3}$ can provide a bias voltage for the synchronous rectifier switch controller $U_3$, and differential capacitance $C_{ya}$ can provide driving energy for synchronous rectifier switch controller $U_3$. Those skilled in the art will recognize that clamp circuits 301 and 302 can also be realized by other suitable circuitry.

Figure 4:
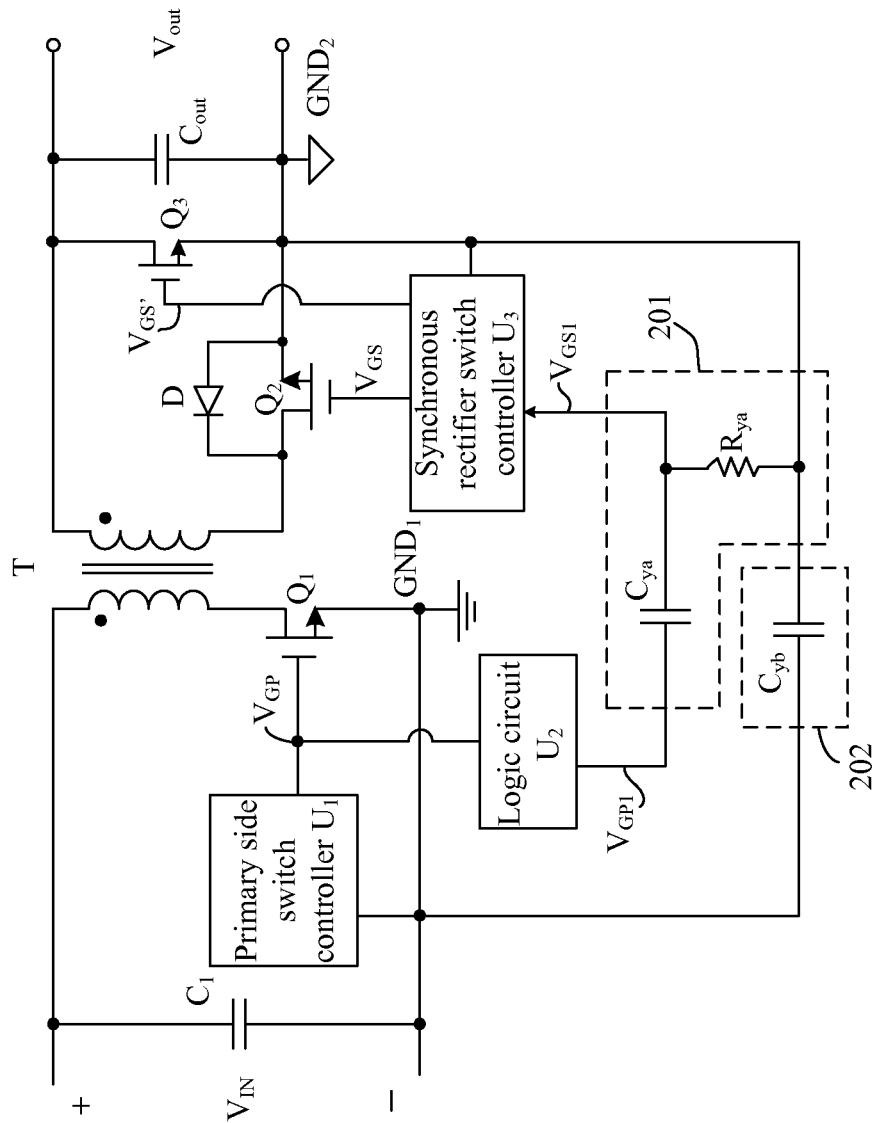
FIG. 4 is a schematic block diagram of a third example flyback synchronous rectification switching power supply in accordance with embodiments of the present invention.

Referring now to FIG. 4, shown is a schematic diagram of a third example flyback synchronous rectification switching power supply in accordance with embodiments of the present invention. This example flyback synchronous rectification switching power supply can include a power stage circuit and a drive circuit, where the power stage circuit can include filter capacitor $C_1$, transformer T, primary side switch $Q_1$, synchronous rectifier switch $Q_2$, synchronous rectifier switch $Q_3$, and output filter capacitor $C_{out}$. The drive circuit can include primary side switch controller $U_1$, logic circuit $U_2$, converting circuit 201, and synchronous rectifier switch controller $U_3$.

In this particular example, synchronous freewheeling transistor $Q_3$ and output filter capacitor $C_{out}$ can be connected in parallel, and synchronous rectifier switch controller $U_3$ can simultaneously generate synchronous freewheeling control signal $V_{GS'}$ to control synchronous freewheeling transistor $Q_3$. Except for generating synchronous rectifier switch control signals $V_{GS}$, synchronous rectifier switch controller $U_3$ can be realized by the example shown in FIG.

2D, where the inverting terminal Q of RS flip-flop 221 can be used to output synchronous freewheeling control signal $V_{GS'}$.

As the power stage circuit topology shown in the example of FIG. 4 is different from that in FIG. 2A, when primary side switch $Q_1$ of the present example is turned on, synchronous rectifier switch $Q_2$ can be simultaneously turned on. When primary side switch $Q_1$ is turned off, synchronous rectifier switch $Q_2$ can be also simultaneously turned off. Therefore, the working principle of the flyback synchronous rectifier switching power drive circuit in this example can be slightly different from the flyback synchronous rectification switching power supply drive circuit shown in FIGS. 2A to 2D.

The difference is that, in this example, since synchronous rectifier switch $Q_2$ and primary switch transistor $Q_1$ can be in a same phase, and inverter 211 may not be included in logic circuit $U_3$ or synchronous rectifier switch controller $U_2$. In other words, control signal $V_{GP1}$ can be obtained by delaying primary side switch control signal $V_{GP}$ through logic circuit $U_2$, and synchronous rectifier switch control signal $V_{GS}$ can be obtained based on control signal $V_{GS1}$ through synchronous rectifier switch controller $U_3$.

Figure 5:
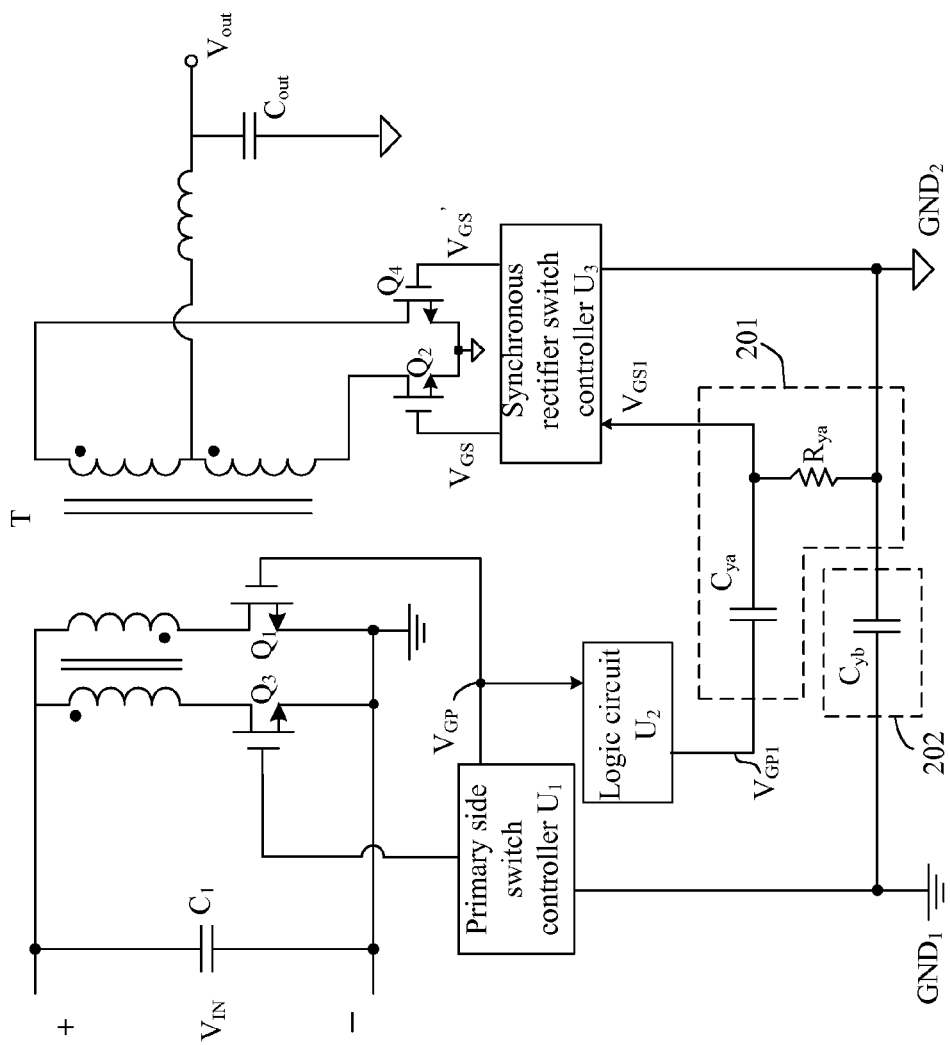
FIG. 5 is a schematic block diagram of a fourth example flyback synchronous rectification switching power supply in accordance with embodiments of the present invention.

Referring now to FIG. 5, shown is a schematic block diagram of a fourth example flyback synchronous rectification switching power supply in accordance with embodiments of the present invention. In this particular example, the power stage circuit can include a push-pull topology. To accommodate the push-pull topology, primary switch controller $U_1$ and synchronous rectifier switch controller $U_3$ can generate two control signals.

Since the control signals of primary switch $Q_1$ and synchronous rectifier switch $Q_2$ can be in the same phase, the push-pull synchronous rectification switching power supply can be controlled based on the flyback synchronous rectification switching power supply drive circuit as shown in FIG. 4. Further, since primary switch $Q_1$ and synchronous rectifier switch $Q_4$ can be inverted, the push-pull synchronous rectification switching power supply can be controlled based on the flyback synchronous rectification switching power supply drive circuit of FIG. 2A. Similarly, based on relationship between the control signals for primary side switch $Q_3$ and synchronous rectifier switch $Q_2$ or $Q_4$, the drive method of FIG. 2A or FIG. 4 can be used to control the push-pull synchronous rectification switching power supply.

Thus, a suitable drive circuit can be selected based on the logical relationship of the switching states of the primary side switch and the synchronous rectifier switch in the synchronous rectification switching power supply of different topologies. For example, when the switching state of the primary side switch transmitted to logic circuit $U_2$ and the switching state of the synchronous rectifier switch controller output by synchronous rectifier switch $U_3$ (e.g., terminal Q of RS flip-flop 221 in synchronous rectifier switch controller $U_3$ of FIG. 2D) are reversed, the drive circuit can be designed based on the principle of the flyback synchronous rectification switching power supply circuit in FIG. 2A.

When the switching state of the primary side switch transmitted to logic circuit $U_2$ and the switching state of the synchronous rectifier switch controller output by synchronous rectifier switch $U_3$ (e.g., terminal Q of RS flip-flop 221 in synchronous rectifier switch controller $U_3$ shown in FIG. 2D) are in a same phase, the drive circuit can be designed based on the principles of flyback synchronous rectification circuit in FIG. 4. One difference between the drive circuits in FIG. 2A and FIG. 4 is that, in the example shown in FIG. 2A, an inverter can be added to primary side switch controller $U_1$ or the synchronous rectifier switch controller $U_3$.

Figure 6:
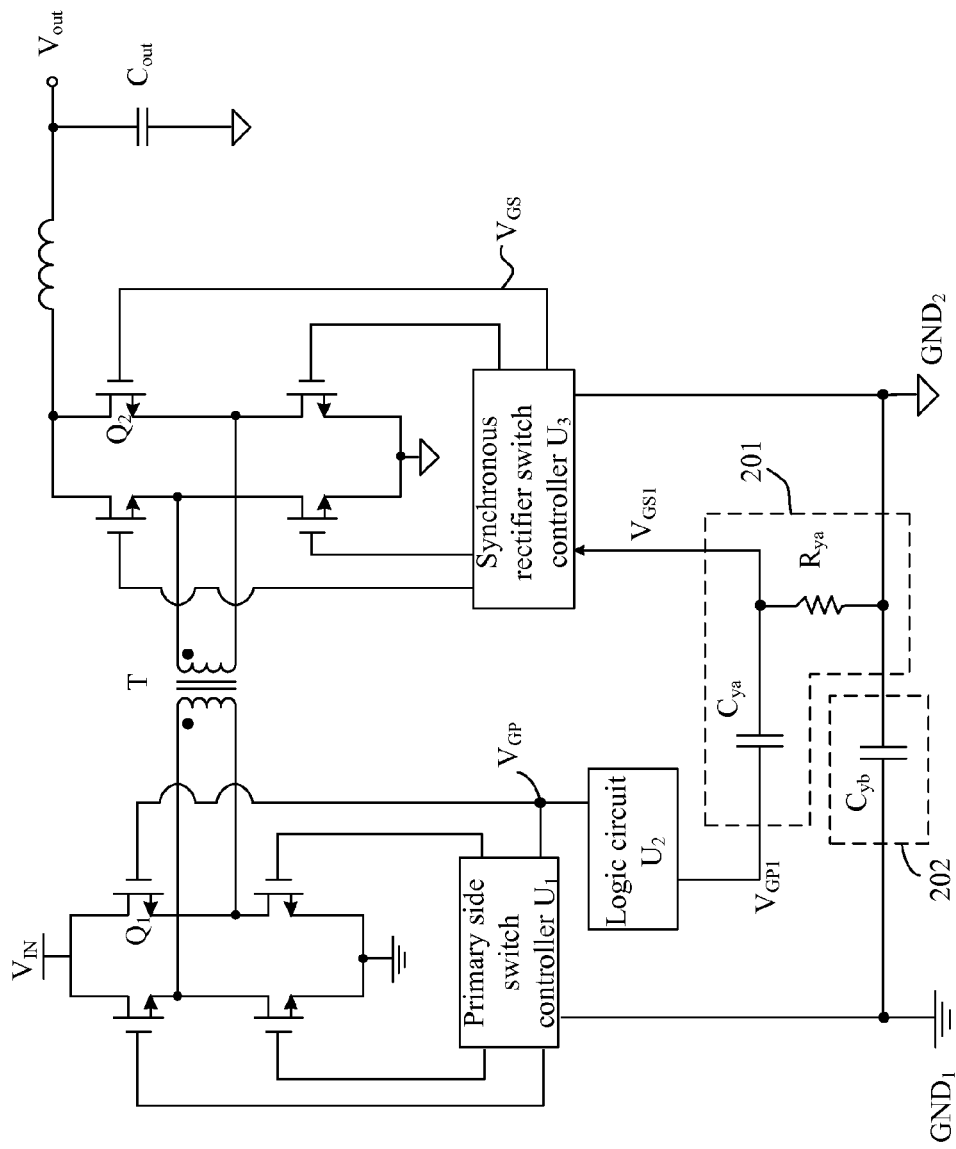
FIG. 6 is a schematic block diagram of a fifth example flyback synchronous rectification switching power supply in accordance with embodiments of the present invention.

Referring now to FIG. 6, shown is a schematic diagram of a fifth example flyback synchronous rectification switching power supply in accordance with embodiments of the present invention. The drive circuit of this example can be realized based on the principles of the push-pull synchronous rectification switching power supply drive circuit discussed above. Those skilled in the art will also recognize that various modifications, such as those made in the example of FIG. 3 based on the example shown in FIG. 2A, can also be applied to the examples shown in FIG. 4, FIG. 5, and FIG. 6.

In one embodiment, a control and drive method configured for a synchronous rectification switching power supply, can include: (i) generating a primary side switch control signal; (ii) generating a first control signal by performing a logic operation on the primary side switch control signal; (iii) generating a second control signal by differential conversion of the first control signal; and (iv) generating a synchronous rectifier switch control signal in response to the second control signal.

Figure 7A:
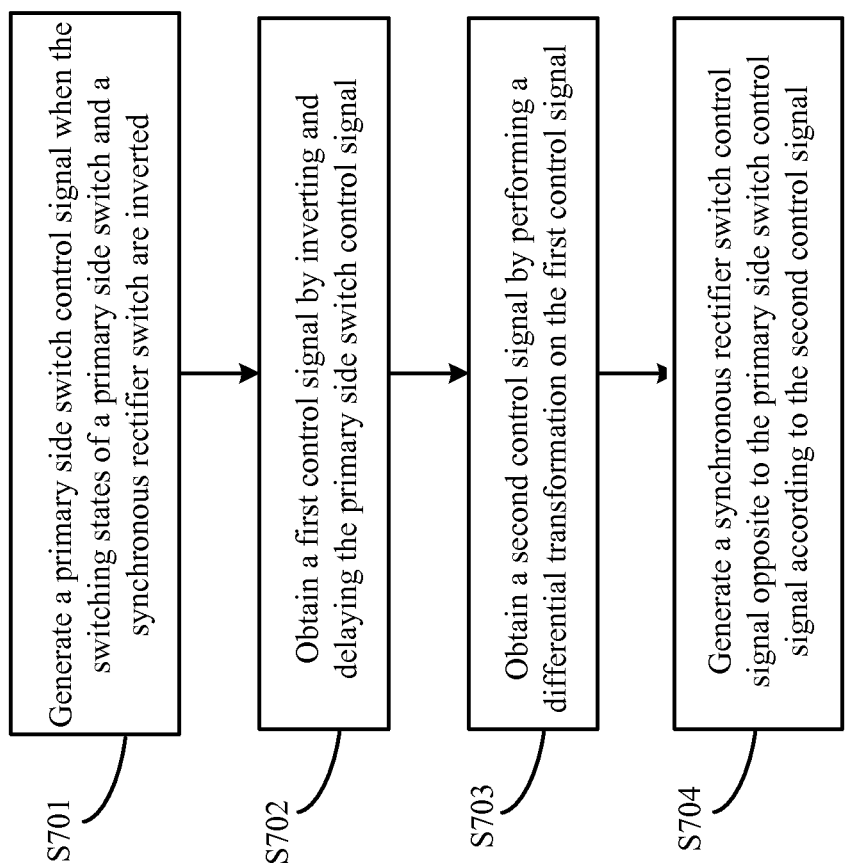
FIG. 7A is a flow diagram of a first example control and drive method in accordance with embodiments of the present invention.

Referring now to FIG. 7A, shown is a flow diagram of a first example drive and control method in accordance with embodiments of the present invention. At S701, a primary side switch control signal can be generated when the switching states of the primary side switch and the synchronous rectifier switch are inverted. At S702, a first control signal can be obtained by inverting and delaying the primary side switch control signal. At S703, a second control signal can be obtained by performing a differential transformation on the first control signal. At S704, a synchronous rectifier switch control signal opposite to the primary side switch control signal can be generated based on the second control signal.

For example, S702 may include the delay control, and at S704, a third control signal can be generated based on the second control signal. Also, the synchronous rectifier switch control signal opposite to the primary side switch control signal can be generated by inverting the third control signal.

Figure 7B:
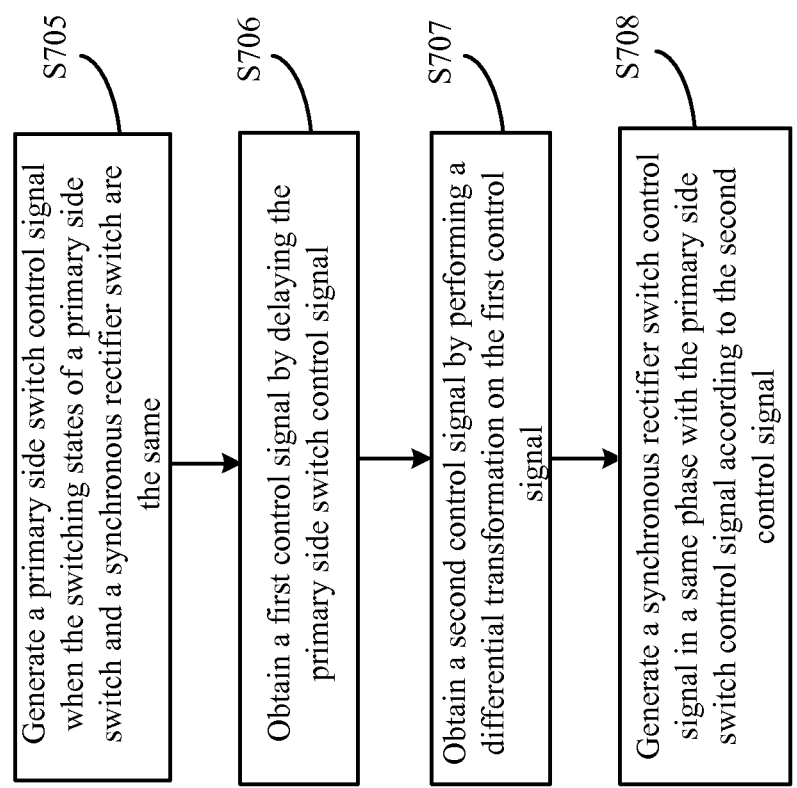
FIG. 7B is a flow diagram of a second example control and drive method in accordance with embodiments of the present invention.

Referring now to FIG. 7B, shown is a flow diagram of a second example drive and control method in accordance with embodiments of the present invention. At S705, the primary side switch control signal can be generated when the switching states or phases of the primary side switch and the synchronous rectifier switch are the same. At S706, the first control signal can be obtained by delaying the primary side switch control signal. At S707, the second control signal can be obtained by performing a differential transformation on the first control signal. At S708, a synchronous rectifier switch control signal in the same phase with the primary side switch control signal can be generated based on the second control signal. For example, the primary side switch control signal and the synchronous rectifier switch control signal can be separately used for controlling the primary side switch and the synchronous rectifier switch in the power stage circuit of the synchronous rectifier switching power supply.

For example, S701 and S705 can also include, when the synchronous rectifier switching power supply has one or more primary side switches, one of the control signals of the primary side switches can be set as the primary side switch control signal, and the control signals of the rest primary side switches can be set based on their logic relationship with the primary side switch control signal. Also, at S702 and S706, delay control of the primary side switch can be implemented by an RC delay circuit. Further, at S702, the inverting control of the primary side switch control can be realized by an inverter. In addition, at S703 and S707, the differential transformation of the control signal can be realized via an RC differential circuit.

At S704 and S708, the synchronous rectifier switch control signal can be generated by applying a zero crossing detection circuit and an RS flip-flop based on the second control signal. Similarly, when the synchronous rectifier switching power supply has more than one synchronous rectifier switches, one of the control signals of the synchronous rectifier switches can be set as the primary side switch control signal, and the control signal of the remaining primary side switches can be set based on their logic relationship with the primary side switch control signal.

In addition, the primary side ground and the secondary side ground of the synchronous rectification switching power supply can be isolated by a capacitor. Of course, in this example, the inverting control, the delay control, first control signal conversion, and generation of the synchronous rectifier switch control signal, and isolation as described above, can also be implemented by other suitable circuit structures. In addition, any suitable converter or power supply topology (e.g., flyback, forward, push-pull, full-bridge, etc.) can be employed in particular embodiments.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A control and drive circuit configured for a synchronous rectification switching power supply, the control and drive circuit comprising:
    a) a primary side switch controller configured to generate a primary side switch control signal to directly control a primary side power switch of said synchronous rectification switching power supply;
    b) a logic circuit configured to generate a first control signal based on said primary side switch control signal;
    c) a converting circuit directly connected to a secondary side ground, and being configured to generate a second control signal based on said first control signal, wherein said second control signal comprises a positive spike signal that rises instantaneously and decreases exponentially in response to each low to high transition of said first control signal, and a negative spike signal that falls instantaneously and increases exponentially in response to each high to low transition of said first control signal;
    d) an isolation circuit configured to isolate a primary side ground that is connected to said primary side power switch from said secondary side ground, wherein said isolation circuit is directly connected to said primary side ground and to said secondary side ground with no other devices therebetween; and
    e) a synchronous rectifier switch controller configured to generate a synchronous rectifier switch control signal based on said second control signal such that phases of said primary side switch control signal and said synchronous rectifier switch control signal are the same or inverse based on a topology of said synchronous rectification switching power supply.

2. The control and drive circuit of claim 1, wherein said logic circuit comprises a delay circuit and an inverter, and wherein when switching states of said primary side power switch and a synchronous rectifier switch in said synchronous rectification switching power supply are opposite:
    a) said logic circuit is configured to generate said first control signal by delaying and inverting said primary side switch control signal; and
    b) said synchronous rectifier switch controller is configured to generate said synchronous rectifier switch control signal in accordance with a zero-crossing time of said second control signal.

3. The control and drive circuit of claim 1, wherein said logic circuit comprises a delay circuit, and wherein when switching states of said primary side power switch and a synchronous rectifier switch in said synchronous rectification switching power supply are opposite:
    a) said delay circuit is configured to delay said primary side switch control signal to generate said first control signal;
    b) said synchronous rectifier switch controller is configured to generate a third control signal in accordance with a zero-crossing time of said second control signal; and
    c) said synchronous rectifier switch controller is configured to invert said third control signal to generate said synchronous rectifier switch control signal.

4. The control and drive circuit of claim 1, wherein said logic circuit comprises a delay circuit, and wherein when switching states of said primary side power switch and a synchronous rectifier switch in said synchronous rectification switching power supply are consistent:
    a) said delay circuit is configured to delay said primary side switch control signal to generate said first control signal; and
    b) said synchronous rectifier switch controller is configured to generate said synchronous rectifier switch control signal in accordance with a zero-crossing time of said second control signal.

5. The control and drive circuit of claim 1, wherein said converting circuit comprises a differential capacitor and a differential resistor, and wherein said differential resistor is connected to said isolation circuit.

6. The control and drive circuit of claim 1, wherein said isolation circuit is separate from said converting circuit.

7. The control and drive circuit of claim 6, wherein said isolation circuit is an isolation capacitor that is directly connected to said converting circuit.

8. The control and drive circuit of claim 1, further comprising:
    a) a first clamp circuit configured to protect said primary side switch controller, wherein said first clamp circuit comprises first and second diodes coupled in series; and
    b) a second clamp circuit configured to protect said synchronous rectifier switch controller, wherein said second clamp circuit comprises third and fourth diodes coupled in series.

9. The control and drive circuit of claim 8, wherein:
    a) when a magnitude of said first control signal is greater than a first clamping voltage or less than a second clamping voltage, said first clamping circuit is configured to clamp said first control signal to said first clamping voltage or said second clamping voltage; and
    b) when a magnitude of said second control signal is greater than a third clamping voltage or less than a fourth clamping voltage, said second clamping circuit is configured to clamp said second control signal to said third clamping voltage or said fourth clamping voltage.

10. The control and drive circuit of claim 1, wherein said synchronous rectifier switch controller comprises an RS flip-flop configured to generate said synchronous rectifier switch control signal.

11. The control and drive circuit of claim 10, wherein said synchronous rectifier switch controller further comprises:
   a) a first comparator configured to compare said first control signal against a first reference voltage, and to output a first comparison signal; and
   b) a first single pulse generator configured to receive said first comparison signal, and to generate a reset signal for said RS flip-flop.

12. The control and drive circuit of claim 11, wherein said synchronous rectifier switch controller further comprises:
   a) a second comparator configured to compare said first control signal against a second reference voltage, and to output a second comparison signal; and
   b) a second single pulse generator configured to receive said second comparison signal, and to generate a set signal for said RS flip-flop.

13. The control and drive circuit of claim 12, wherein:
   a) said first reference voltage is less than about zero; and
   b) said second reference voltage is greater than about zero.

14. A control and drive method configured for a synchronous rectification switching power supply, the method comprising:
   a) generating a primary side switch control signal for directly controlling a primary side power switch of said synchronous rectification switching power supply;
   b) generating a first control signal by performing a logic operation on said primary side switch control signal;
   c) generating, by a converting circuit directly connected to a secondary side ground, a second control signal by differential conversion of said first control signal, wherein said second control signal comprises a positive spike signal that rises instantaneously and decreases exponentially in response to each low to high transition of said first control signal, and a negative spike signal that falls instantaneously and increases exponentially in response to each high to low transition of said first control signal;
   d) isolating, by an isolation circuit, a primary side ground that is connected to said primary side power switch from said secondary side ground, wherein said isolation circuit is directly connected to said primary side ground and to said secondary side ground with no other devices therebetween; and
   e) generating a synchronous rectifier switch control signal in response to said second control signal.

15. The method of claim 14, wherein said isolation circuit is an isolation capacitor that is directly connected to said converting circuit.

16. The method of claim 14, wherein when switching states of said primary side power switch and a synchronous rectifier switch in said synchronous rectification switching power supply are opposite, the method further comprises:
   a) delaying and inverting said primary side switch control signal to generate said first control signal; and
   b) generating said synchronous rectifier switch control signal opposite to said primary side switch control signal and in accordance with said second control signal.

17. The method of claim 14, wherein when switching states of said primary side power switch and a synchronous rectifier switch in said synchronous rectification switching power supply are consistent, the method further comprises:
   a) delaying said primary side switch control signal to generate said first control signal; and
   b) generating said synchronous rectifier switch control signal with a same phase as said primary side switch control signal in accordance with said second control signal.

18. The method of claim 14, wherein said generating said second control signal comprises using a differential capacitor and a differential resistor, said differential resistor being connected to said isolation circuit.

19. The method of claim 14, further comprising clamping said first control signal to a first clamping voltage or a second clamping voltage when a magnitude of said first control signal is greater than said first clamping voltage or less than said second clamping voltage.

20. The method of claim 19, further comprising clamping said second control signal to a third clamping voltage or a fourth clamping voltage when a magnitude of said second control signal is greater than said third clamping voltage or less than said fourth clamping voltage.

* * * * *